Patented May 21, 1946

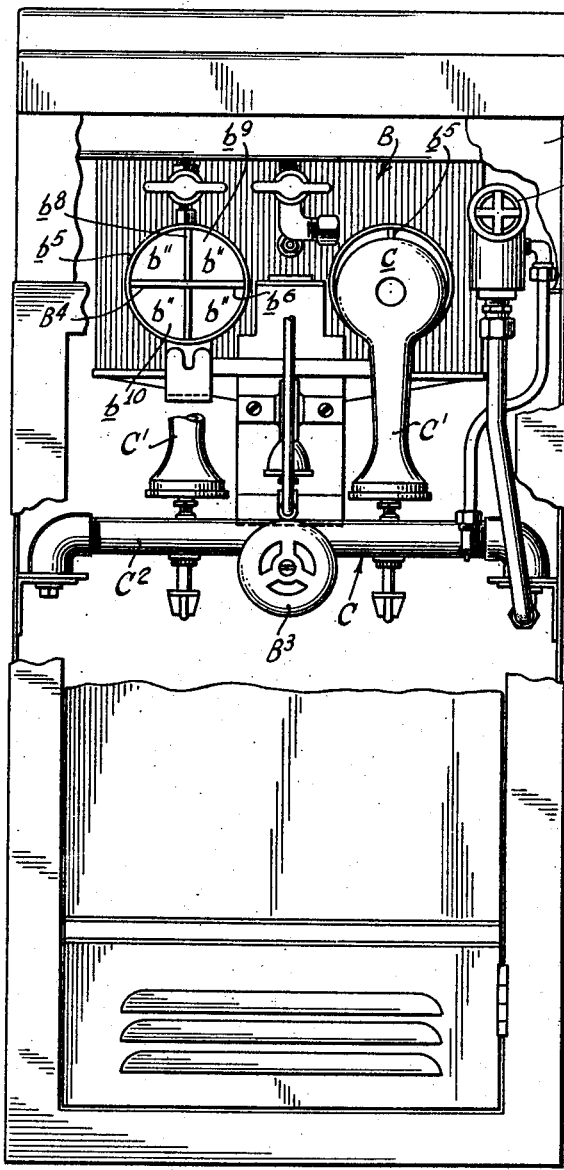
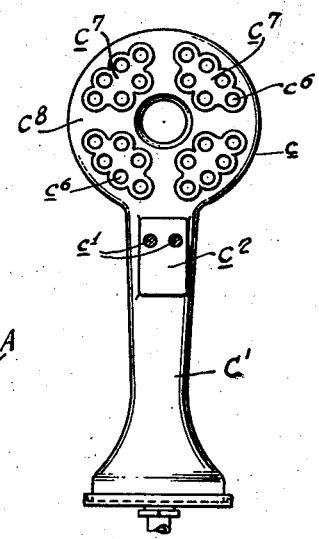
Fig. 1.
Fig. 3.

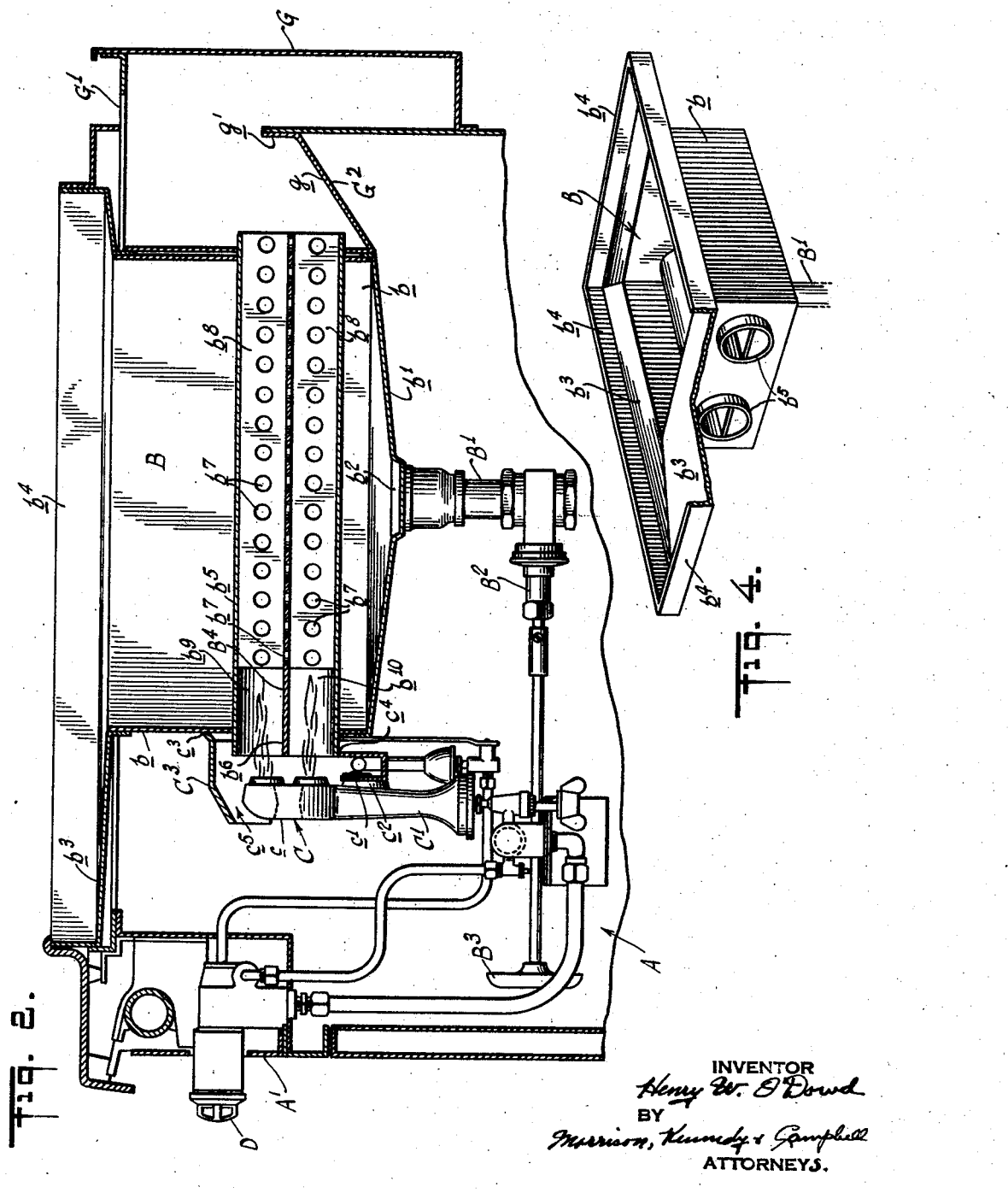

2,400,653

UNITED STATES PATENT OFFICE 2,400,653

LIQUID HEATING APPARATUS

Henry W. O'Dowd, Jersey City, N. J., assignor to Standard Gas Equipment Corporation, a corporation of Maryland Application March 5, 1942, Serial No. 433,437

8 Claims. (Cl. 126—391)

This invention relates to liquid heating apparatus, and more particularly to the gas-fired variety. Although adapted for general application, the apparatus is intended especially for cooking purposes, such as deep fat frying.

The object of the invention is to obviate objectionable features of existing heating apparatus, chief among which are waste of fuel and cooking liquid (cooking fat or oil) and impairment of taste and color of the food cooked. These objectionable features arise from the heating of the cooking liquid by the application of the burner flame directly to the vessel or a portion thereof in immediate contact with the liquid contained therein. Fuel is wasted by the failure to obtain complete combustion and to utilize the products of combustion to the fullest extent to heat the liquid, and in maintaining at the desired temperature the upper region of the body of liquid wherein the cooking is done and which is remote from the source of heat. The liquid at the point where the heat is applied to the vessel is subjected to superheating and scorching, causing it to smoke and become discolored, the food in turn being discolored and rendered distasteful thereby so that the liquid must be renewed frequently when otherwise it could be used for a much longer period. Moreover, particles of food which settle into the superheated region of the vessel carbonize and disintegrate and are carried with the liquid as it circulates throughout the vessel to the cooking area where they become deposited upon the food being cooked. Recent developments intended to overcome the foregoing objectionable features of deep fat frying apparatus comprise the employment of one or more heating flues opening at opposite ends exteriorly of the vessel and extending through the interior of the vessel in spaced relation to the walls thereof so as to be surrounded by the liquid fat in the vessel. The heat is supplied by a Bunsen burner located relatively to one end of the flue so that the burner flame is projected thereinto for a considerable distance. It has been found that no matter how the burner is positioned relatively to the flue imperfect combustion results because the burner flame entering the end of the heating flue bunches together and rises to the top surface of the flue, so that aeration of the flame is permitted at the under side of the flame only. In addition to the fuel-heat inefficiency resulting from incomplete aeration of the flame, there is an undesirable carbon monoxide accumulation in the flue. Moreover, what heat units are produced are not distributed equally throughout the inner surface of the flue and for this reason it is impossible to obtain maximum heat absorption.

The present invention is intended to overcome these and other objectionable features, and in its broader aspects contemplates the provision of means for effecting the adequate aeration of the burner flame for complete combustion to minimize the carbon monoxide content of the products of combustion and produce the highest possible number of heat units, and means to provide for the equal distribution of the heat units throughout the inner surface of the heating flue. More specifically, the heating flue (or each of them if two or more are employed) is divided cross-sectionally throughout its length by a member which at the burner end thereof separates the flue for a portion of its length into a plurality of separate and non-communicating combustion chambers; and beyond the combustion chambers vanes radiating from the dividing member and extending throughout the remainder of the length of the flue cooperate with the dividing member in separating the flue into a plurality of passageways for conducting the products of combustion therethrough. Intercommunication between the passageways for the equal expansion of the hot gases therein is provided for by a series of perforations formed in each of the vanes and in the dividing member. A Bunsen burner is located in spaced relation to the end of the heating flue so that a part of the flame from the burner is projected into each of the combustion chambers and thereby prevented from bunching up at the top of the heating flue. A hood or shield covers the burner and the end of the heating flue, sufficient space being left between the hood and the burner for the entrainment of a supply of secondary air adequate to support combustion within the chambers and, the flame being maintained in a spread condition, proper aeration thereof and complete combustion is obtained. Preferably the flame ports in the burner head are arranged in clusters which are aligned with the combustion chambers so that the flame is projected thereinto in a plurality of separate jets, whereby the secondary air can completely surround each jet in intimate contact therewith.

In the accompanying drawings, the invention has been shown merely by way of example and in preferred form and obviously many variations and modifications may be made therein which will still be comprised within its spirit. It is to be understood, therefore, that the invention is not limited to any specific form or embodiment, except insofar as such limitations are specified in the appended claims.

Referring to the drawings:

Fig. 1 is a front elevation of the apparatus, the casing and one of the burners being partly broken away to show the interior;

Fig. 2 is a vertical section, showing a portion of the apparatus of Fig. 1 and the interior of one of the heating flues;

Fig. 3 is a face view of one of the Bunsen burners, showing the clustered arrangement of the flame ports; and Fig. 4 is a perspective view of the liquid containing vessel, partly broken away to show the ends of the heating flues.

In general, the heating apparatus is of the cabinet type enclosed except at the top by a casing $A$ which houses a liquid containing vessel $B$ and all of the heating mechanism $C$ except the manually adjustable thermostatic heat control unit $D$ which projects through the front wall $A^1$ of the casing in a readily accessible position. As clearly shown in Figs. 2 and 4, the vessel $B$ comprises vertical side walls $b$ and a bottom wall $b^1$, the latter converging from the side walls $b$ toward a central drain opening $b^2$ to which a drain pipe $B^1$ is coupled. The drain pipe $B^1$ is closed by a valve mechanism $B^2$ controlled by a handle $B^3$ located near the front of the apparatus, whereby the contents of the vessel, in whole or in part, may be drawn off at will. The vessel is rimmed at the top by a wide slightly inclined flange $b^3$ for returning splashed and overflowing liquid to the vessel, and the flange $b^3$ itself is bordered by a vertical anti-splash rim $b^4$. Near the base of the vessel $B$, but spaced from the bottom wall $b^1$ thereof are two heating flues $b^5$ extending fore and aft through the interior of the vessel $B$ and opening through the front and rear walls $b$ to which they are sealed around their edges as by welding. The heating flues $b^5$ are circular in cross-section, which prevents sediment from collecting on the tops of the flues and also permits the free circulation of the liquid around the flues in intimate contact therewith. Their form and spaced arrangement enable the flues to be easily cleaned and renders the portion of the vessel beneath them accessible for cleaning. The size of the heating flues $b^5$ is regulated to the liquid capacity of the vessel $B$ so that collectively they provide adequate heating surfaces in order that the liquid in the vessel may be brought to and maintained at a given temperature with a minimum of fuel consumption.

The operation of the heating mechanism $C$ is thermostatically controlled, all in the usual manner which need not be described.

According to the present invention, two Bunsen burners $C^1$, one for each heating flue $b^5$, are fed from a manifold $C^2$. The burners $C^1$ are vertically disposed with the head $c$ of each in register with the front end of one of the heating flues $b^5$, it being noted that the burner head $c$ is of slightly less diameter than the end of the heating flue $b^5$ and is located in spaced relation thereto (Figs. 1 and 2). A hood or shield $C^3$ fastened by screws $c^1$ to a boss $c^2$ formed on the burner below the head $c$ thereof is formed to locate the burner $C^1$ in its spaced relation to the heating flue $b^5$ and also to control the entrainment of secondary air around the head $c$ of the burner and into the heating flue $b^5$ to support combustion. To these ends, the rear edge of the hood $C^3$ banks against the front wall $b$ of the vessel $B$, as at $c^3$, and the bottom surface of the heating flue $b^5$, as at $c^4$. The hood $C^3$ is arcuate shaped in cross-section to follow the contour of the burner head $c$ and extends forwardly and downwardly beyond the front face of the burner head $c$, the size and shape of the hood being such that a passage $c^5$ for the supply of secondary air is provided between it and the burner head which causes the air to flow around the burner head and be directed toward the flame and entrained therewith into the heating flue.

Each of the heating flues $b^5$ is divided cross-sectionally for the twofold purpose of maintaining the burner flame in a spread condition for the complete aeration thereof and for conducting the products of combustion through the flue in definite passageways so as to effect the even distribution of heat units throughout the inner surface of the flue. Referring particularly to Fig. 2, the heating flue $b^5$ is divided throughout its length by a horizontal partitioning member $B^4$ having a solid portion $b^6$ extending for a limited distance inwardly from the burner end of the heating flue and being perforated throughout the remainder of its length by a series of openings $b^7$ located on opposite sides of its median line. A pair of vanes $b^8$ centered with respect to the dividing plate $B^4$ extend vertically or at right angles thereto, one upwardly to the top of the heating flue $b^5$ and the other downwardly to the bottom of the heating flue. The vanes $b^8$ are coextensive with the perforated portion of the dividing plate $B^4$ and they too are formed each with a series of perforations $b^7$. Thus the heating flue $b^5$ is separated at the burner end thereof by the solid portion $b^6$ of the dividing plate $B^4$ into upper and lower combustion chambers $b^9$ and $b^{10}$, respectively, and rearwardly of the combustion chambers it is separated by the dividing plate $B^4$ and the vanes $b^8$ into four passageways $b^{11}$ extending throughout the remainder of the length of the heating flue. The dividing plate $B^4$ and the vanes $b^8$ in no way baffle or interfere with the rearward passage of the products of combustion through the heating flue $b^5$, their function being to guide the products of combustion rearwardly from the combustion chambers $b^9$ and $b^{10}$ in definite passageways. However, they limit the sidewise expansion of the hot gases in order to concentrate the heat units of the gases entering each passageway on a definite area of the inner surface of the heating flue. Should there be an unequal volume of the products of combustion entering the individual passageways from the combustion chamber $b^9$ and $b^{10}$, the perforations $b^7$ in the dividing plate $B^4$ and the vanes $b^8$ provide communication between the passageways which permits an equalization of the volume of gases therein.

Referring to Fig. 3, the burner head $c$ is formed with a plurality of flame ports $c^6$ arranged in clusters $c^7$. In the embodiment shown, four spaced apart clusters $c^7$ of flame ports $c^6$ on the burner head $c$ are located so that a pair of clusters is disposed on opposite sides of the transverse median plane of the burner head, on the one hand, and on opposite sides of the longitudinal median plane thereof, on the other hand. Thus when the burner is in operative relation to the heating flue $b^5$ the upper and lower pairs of clusters $c^7$ register with the upper and lower combustion chambers $b^9$ and $b^{10}$, respectively, and each cluster is in horizontal alignment with one of the passageways $b^{11}$ leading from the combustion chambers.

With the foregoing arrangement, the flame projecting into the combustion chambers $b^9$ and $b^{10}$ from each of the clusters $c^7$ is a composite of the plurality of individual jets from the flame ports $c^6$, whereby a spread out flame conducive to thorough aeration is provided. Thus, the projection of the flame into the combustion chambers $b^9$ and $b^{10}$ effects the entrainment of the secondary air through the passage $c^5$ between the burner head $c$ and the hood $C^3$ in a volume determined by the height of the flame. The area of the passage $c^5$ is restricted so that the secondary air is caused to rush therethrough in intimate contact with the burner head $c$ and with such velocity as to be forced across the burner head between the clusters $c^7$ and also into the areas between the individual flame ports $c^6$. Hence, secondary air is present both within and around the composite flame to insure its complete aeration. Furthermore, as shown in Fig. 1, the burner head $c$ is not in exact register with the end of the heating flue $b^5$, the top of the burner head being somewhat lower than the top of the flue, whereby the secondary air rushing in through the passage $c^5$ and into the end of the flue $b^5$ prevents the burner flame from rising to bunch against the top of the combustion chamber $b^9$ and provides a sufficiently thick strata of air in that region both for aeration of the top side of the flame and for affording a protective insulation against possible superheating of the liquid in contact with the outer surface of the flue wall.

A flue box $G$ (Fig. 2) covering the discharge ends of the heating flues $b^5$ encloses substantially the entire rear wall $b$ of the vessel B, thus acting as a heating chamber for the rear of the vessel, and exhausts through a chimney flue aperture $G^1$. A baffle $G^2$ comprising an upwardly inclined surface $g$ and a vertical surface $g^1$ is arranged within the flue box $G$ in rearwardly spaced relation to the discharge ends of the flues $b^5$. The form and disposition of the baffle $G^2$ is such that without interfering with the discharge of the products of combustion from the flues it will cause the hot gases to be spread out laterally through the flue box and also directed upwardly and forwardly toward the rear wall of the vessel.

As already stated, a preferred embodiment of the invention has been shown in the accompanying drawings and obviously many modifications and variations thereof may be made without departing from the spirit of the invention. For example, the heating flues $b^5$ need not be horizontal but may be arranged to incline slightly upwardly and rearwardly. Also combustion chambers $b^9$ and $b^{10}$ may be defined by partitioning means separate and distinct from the partitioning means defining the passageways $b^{11}$. Instead of comprising a plate member with vanes radiating therefrom, the partitioning means defining the passageways $b^{11}$ may be made up of a plurality of vanes radiating from a common center, or two plates slotted along their median lines throughout one-half of their lengths and fitted together into a unit, or in any other desired manner. Many other modifications may occur to those skilled in the art and, therefore, the invention is not to be limited to any specific form or embodiment except insofar as such limitations are specified in the appended claims.

Having thus described my invention, what I claim is:

1. A deep fat frying apparatus including a vessel for containing liquid fat to be heated therein and formed with a heating flue extending through the interior of the vessel in spaced relation to the walls thereof so as to be surrounded by the liquid fat therein and opening at its opposite ends exteriorly of the vessel, and a Bunsen burner formed with flame ports arranged in localized clusters and the burner being located so that the flames therefrom are projected into one end of said flue, characterized by a plate member arranged in the flue for dividing the flue cross-sectionally throughout a portion of its length to form a plurality of chambers into each of which the flames from a cluster of said flame ports are projected, a source of secondary air to support combustion within the chambers, and a member arranged in the flue and comprising a plurality of radially extending vanes defining passageways extending from said chambers throughout the remainder of the length of the flue.

2. A deep fat frying apparatus including a vessel for containing liquid fat to be heated therein and formed with a heating flue extending through the interior of the vessel in spaced relation to the walls thereof so as to be surrounded by the liquid fat therein and opening at its opposite ends exteriorly of the vessel, and a Bunsen burner formed with flame ports arranged in localized clusters and the burner being located so that the flames therefrom are projected into one end of said flue, characterized by a plate member arranged in the flue for dividing the flue throughout a portion of its length to form upper and lower combustion chambers into each of which the flames from a plurality of said clusters of flame ports are projected, a source of secondary air to support combustion within the chambers, and means comprising an extension of said plate member equipped with a vane extending vertically from each face thereof to the flue wall to define four passageways leading from the combustion chambers throughout the remainder of length of the flue, said dividing plate extension and said vanes being formed with perforations to provide communication between the passageways defined thereby.

3. A deep fat frying apparatus including a vessel for containing liquid fat to be heated therein and formed with a heating flue extending through the interior of the vessel in spaced relation to the walls thereof so as to be surrounded by the liquid fat therein and opening at its opposite ends exteriorly of the vessel, and a Bunsen burner formed with flame ports arranged in localized clusters and the burner being located so that the flames therefrom are projected into one end of said flue, characterized by a dividing plate in the flue for separating the flue for a portion of its length to form upper and lower combustion chambers into each of which the flames from a plurality of said clusters of flame ports are projected, a hood arranged relatively to the end of the flue and over the burner in spaced relation thereto to provide a secondary air passage around the burner, and means comprising an extension of said dividing plate and a vane extending vertically from each face thereof to the flue wall to define four passageways leading from the combustion chambers throughout the remainder of length of the flue, the dividing plate extension and the vanes being formed with perforations to provide communication between the passageways.

4. Apparatus according to claim 3, wherein the hood is supported by the burner and is formed to bear against the wall of the vessel to locate the burner in spaced relation to the end of the heating flue.

5. A gas-fired deep fat frying apparatus having a heating flue into which a Bunsen burner flame is adapted to be projected at one end, said flue being divided into upper and lower passageways separated by a longitudinally extending partition member, said partition member being imperforate throughout the initial portion of its length to maintain the burner flame in a spread condition to permit thorough aeration thereof in the presence of secondary air, and being perforate throughout the remaining portion of its length to distribute the heat units of the products of combustion equally throughout the surface of the flue.

6. A gas-fired deep fat frying apparatus according to claim 5, wherein the longitudinally extending partition member is provided with right angularly disposed vanes which divide the upper and lower passageways each into two parallel passageways for the products of combustion.

7. A gas-fired deep fat frying apparatus according to claim 5, wherein the longitudinally extending partition member is provided with right angularly disposed vanes which divide the upper and lower passageways each into two parallel passageways for the products of combustion, said vanes being perforate to permit communication between the parallel passageways.

8. A gas-fired deep fat frying apparatus having a heating flue through which the products of combustion pass, said flue containing a horizontally disposed plate member extending lengthwise from the burner end of the flue and dividing the flue adjacent the burner end into upper and lower straight parallel combustion chambers, an extension of said plate member extending from the combustion chambers throughout the remainder of the flue and a flat vane rearwardly of said combustion chambers and extending vertically from each face of said extension of the plate member to the flue wall and lengthwise from the combustion chambers throughout the remainder of the length of the flue, and dividing said remainder of the flue into straight parallel passageways through which the products of combustion are delivered from the combustion chambers.

HENRY W. O'DOWD.